Feb. 16, 1932.  H. I. LEA  1,845,159
DISTILLATION SYSTEM
Filed May 5, 1928   4 Sheets-Sheet 1
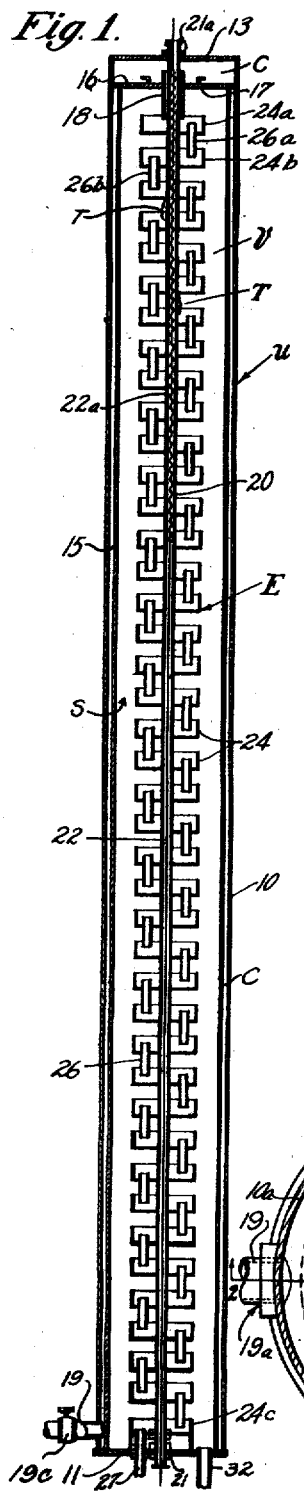
Inventor
Henry I. Lea.
James T. Bachelew
Attorney Feb. 16, 1932.     H. I. LEA     1,845,159
DISTILLATION SYSTEM
Filed May 5, 1928     4 Sheets-Sheet 2
Fig. 5.
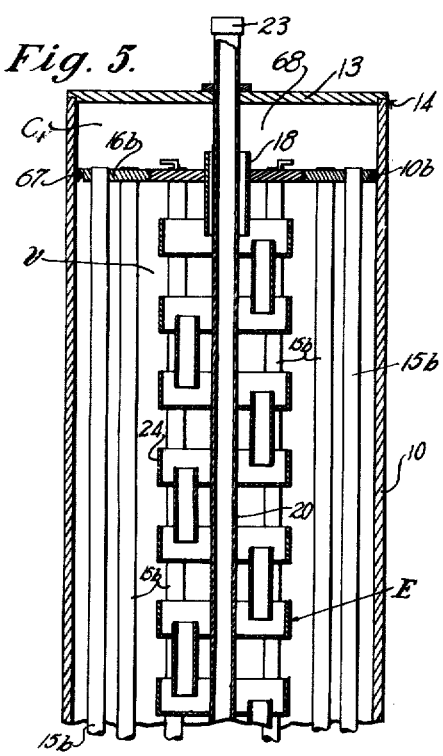
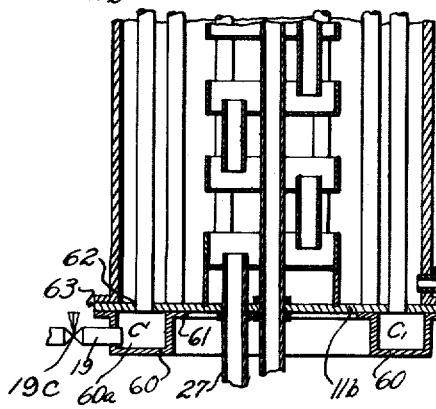
Fig. 6.
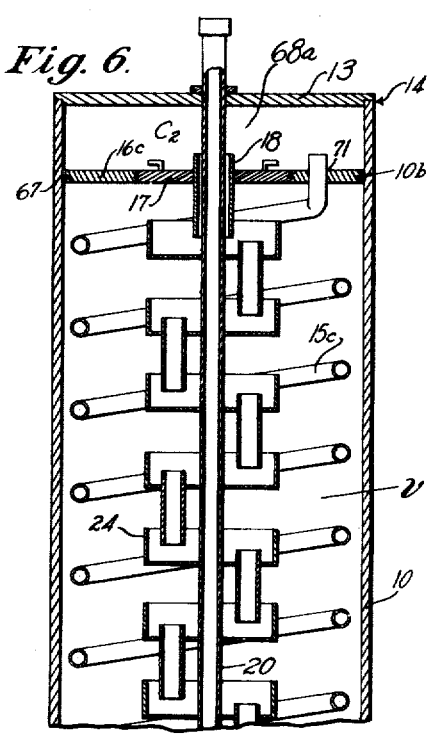
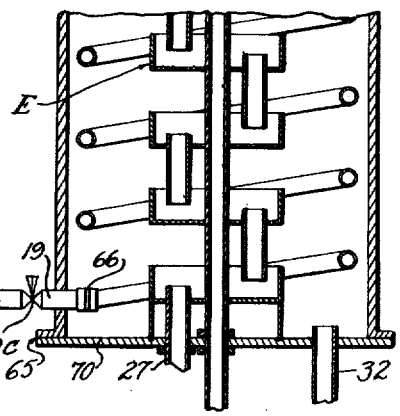
*Inventor*
*Henry I. Lea.*
*Attorney.*

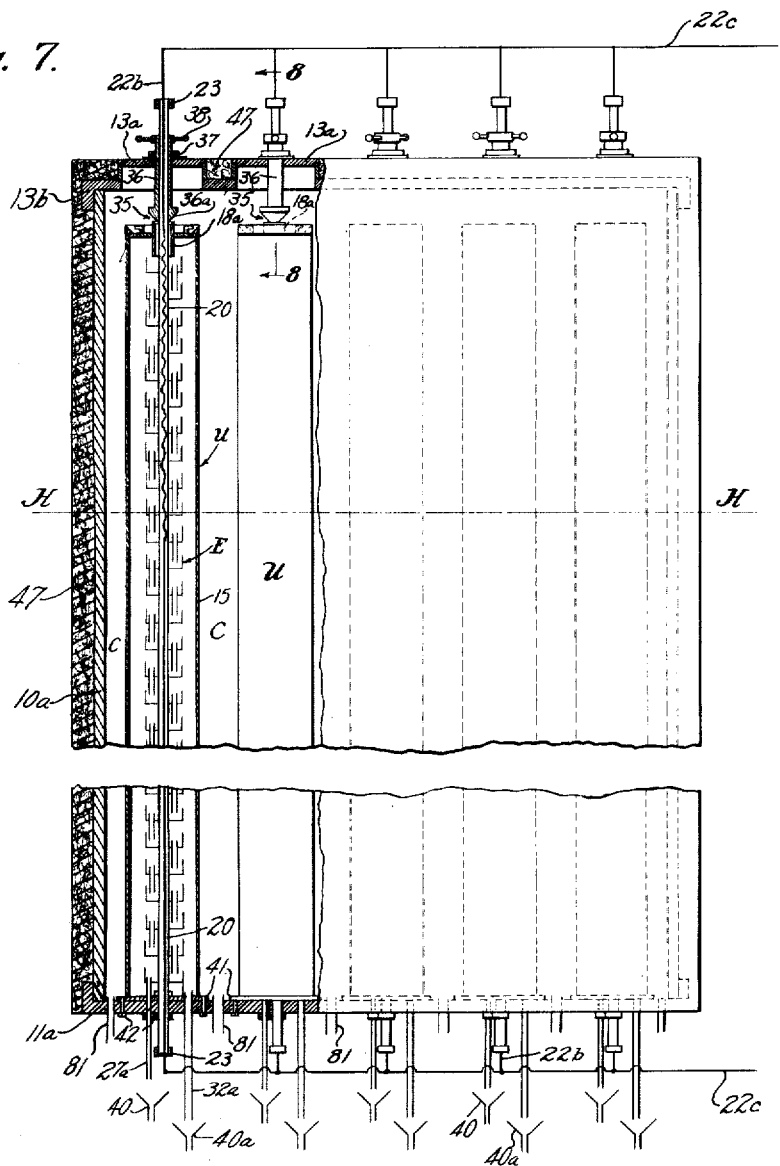

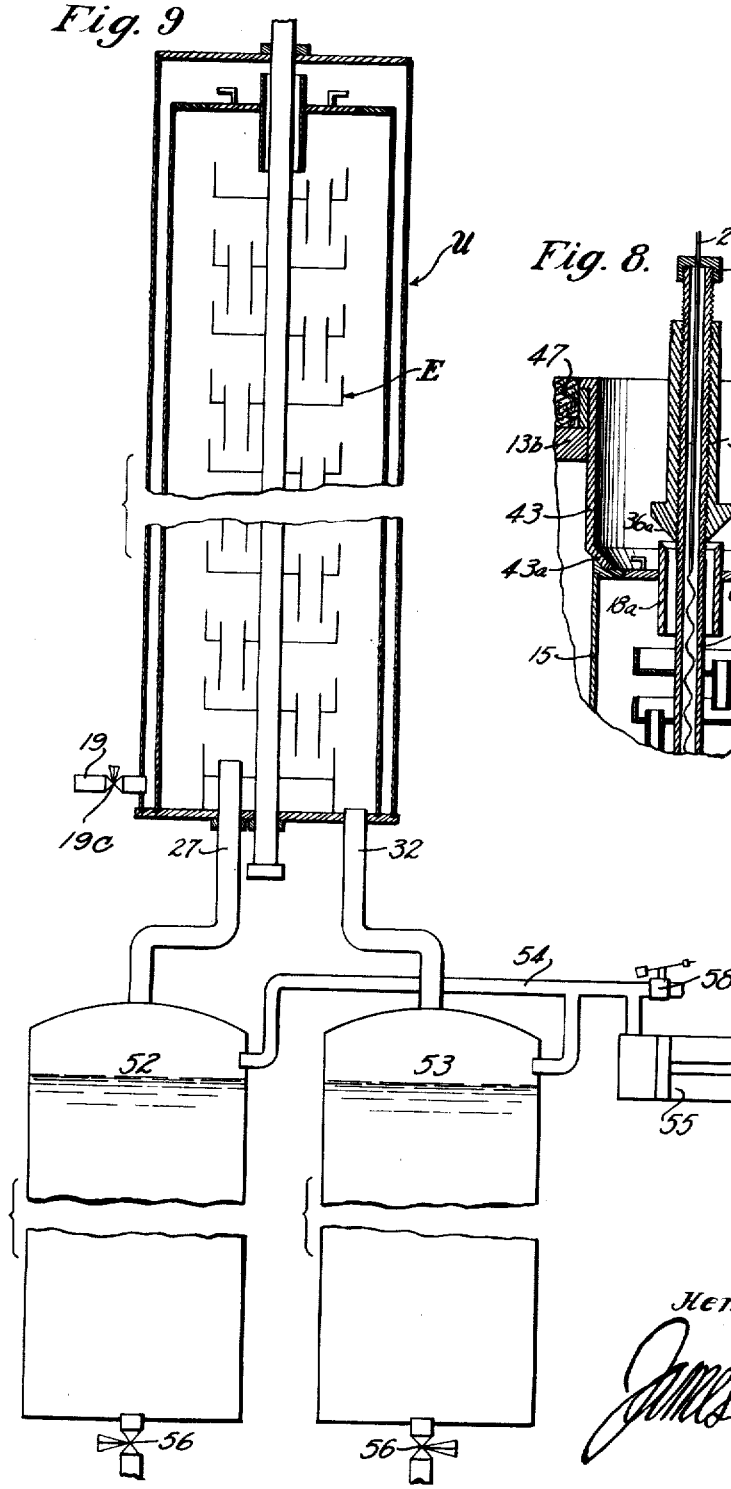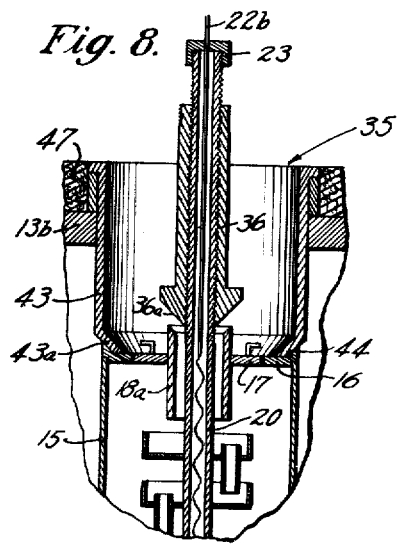

Patented Feb. 16, 1932

1,845,159

UNITED STATES PATENT OFFICE

HENRY I. LEA, OF LOS ANGELES, CALIFORNIA

DISTILLATION SYSTEM

Application filed May 5, 1928. Serial No. 275,437.

The present invention relates generally to distillation systems, stills and condensers, and more particularly to means for effecting extremely economical distillation; it being understood that the utility of the invention is in no way limited to the distillation of any one kind of liquid but is broadly applicable to the distillation of a variety of liquid substances.

The cost involved in operating the usual types of distillation equipment is such as to restrict the scope of utility of the equipment and therefore to limit the variety and amount of products that might otherwise be produced with more economical distillation means. For instance, pure water for industrial uses might more commonly and profitably be obtained from ocean or impure river and lake waters if facilities were available for distillation with greater economy than can be accomplished by usual means, whereas a comparatively limited amount of water, impure water, or no water at all would otherwise be used due to the expense of distillation. It is therefore a purpose of this invention to provide such economical distillation facilities.

By the use of the present distillation apparatus, as hereinafter described, distillation may be accomplished economically due to the fact that heat once put into the system is retained and recycled within the system so as to continuously vaporize the feed liquid without the further addition of heat over that required to satisfy the heat losses from the apparatus and to replace that removed from the system as sensible heat in the distillate and residue. The apparatus is unitary and compact in construction and may be made in comparatively small sizes, suitable for domestic distillation of water for instance, or it may be built in comparatively large unit sizes for ordinary commercial and industrial use, and in battery form for large scale operations—such as special industries, or more generally, irrigation works and city supply.

The various advantages and features of the invention, including those mentioned hereinabove and others of importance, will be more fully understood from the following detailed description of typical embodiments of the invention throughout which reference is made to the accompanying drawings, in which:

Figure 1 is a longitudinal medial section of a unit embodying my invention, certain elements being illustrated diagrammatically;

Fig. 2 is a longitudinally contracted view of Fig. 1, the parts being shown on an enlarged scale;

Fig. 3 is a section on line 3—3 of Fig. 2;

Fig. 4 is a section on line 4—4 of Fig. 2;

Figs. 5 and 6 are similar to Fig. 2, but show variational forms of condensers.

Fig. 7 illustrates a battery installation of units;

Fig. 8 is a fragmentary section on line 8—8 of Fig. 7, but showing certain provisions for removing a unit part from the battery; and Fig. 9 is a view similar to Fig. 2 but showing, conventionally, means for pressure regulation.

It will be understood at this point that the purpose of the drawings and the following description is to set forth the invention clearly, irrespective of certain features of construction that may be altered without departure from the spirit of the invention.

Referring to the drawings, a distillation unit is generally illustrated at U. The unit is seen to embody a vertical cylindrical condenser shell 10 having a bottom end closure 11 fixed thereto, as at 12, and an upper end closure 13 removably fitted to the shell at 14. Extending within the shell and annularly spaced therefrom is a cylindrical tube 15 which, in conjunction with the outer shell end closures 11, 16 and 13 forms a condenser. Although the condenser may be of various forms, as later will be made apparent, the type illustrated in Figs. 1 and 2 will be described as a typical embodiment for a distillation unit U.

The condenser tube 15 is joined to the shell bottom at 15a and at its upper end is provided with a closure embodying a ring plate 16 and a cover plate 17, the former being fitted to tube 15 to form a water tight joint as at 18, and serving as lateral support for said tube through engagement with the outer shell as at 10a. The ring plate is provided with equally spaced apertures 16b around its outer periphery, and is threaded on its inner periphery 16a to receive cover plate 17. It is seen that shell 10 and condenser tube 15 define an annular compartment C which opens upwardly through apertures 16b into the space between the upper end closures of the condenser tube and outer shell. A tube or weir 18, threaded throughout its length, is screwed into a central opening 17a in the cover plate 17 and thus may be adjusted vertically by screwing in either direction. Handles or lugs 80 are provided on the cover in order that for purposes which will later be disclosed, the cover and weir 18 may be removed from the condenser tube after screwing the cover from its seat on plate 16. A liquid feed line 19 containing valve 19c extends through shell 10 at 19a, the purpose of this line being to admit liquid to the lowermost portion of compartment C.

Extending through the interior of the condenser tube, which interior I term an evaporating chamber V, is an evaporator generally indicated at E, annularly spaced from the condenser tube 15, as at S. It is understood that any suitable form of evaporating means may be used, but that the type described hereinafter is a preferred form which has been found to be satisfactory for the present purposes.

Embodied in the evaporator E is a heater tube 20 extending through the outer shell bottom at 21, within and annularly spaced from weir 18 as at A, and through the upper closure 13 at 21a. The heater tube is supported vertically by means of lock nuts 31 and 31a bearing against the upper and lower surfaces, respectively, of plate 11. Although heat supply means of any suitable nature may be contained within tube 20, I have provided, for this purpose, an electric heating element 22 which extends through the tube and around which any suitable material may be packed for conducting heat from the element to the tube wall. It is understood that tube 20, in effect, may constitute the sheath for an electric heating element; that is, the same tube that supports the cups may be the only metal wall between the source of heat and the liquid. A section of high resistance wire 22a is included in the heating element, this section comprising substantially the heating length of the element and extending downward from an upper part of tube 20 a distance in accordance with the extent of heating surface desired. Instead of using a heating element having a single high resistance or heating portion as 22a, it may be desirable to have a series of such portions joined end to end, the members of the series having varied resistances so as to provide for varied heating temperatures within the extent of the heating element. In other words, the heating element—the source of heat—may extend throughout the length of the heating tube, or only a portion of its length; and it may be so arranged as to give different effective temperatures at different portions of its length. I have here shown the heating element extending only a part-length of the tube in order to describe certain actions that take place when the lower part of the tube is not directly heated. The extremities 22b of the heating element, preferably of low resistance wire, extend through caps 23 and may be connected to any suitable source of current.

Mounted on heater tube 20 is a plurality of vertically spaced liquid receiving cups 24, joined to the tube as at 25, and provided with overflow pipes 26. It is evident that liquid discharged into uppermost cup 24a through weir 18, overflows through pipe 26a into cup 24b, then flows laterally across that cup and around sheath 20, and continues downward, similarly through the successive cups, to cup 24c. Liquid in cup 24c is discharged through outlet pipe 27, which passes through plate 11, leakage being prevented by lock-nut 28a (with packing) which is threaded onto pipe 27. Cup 24c rests at 29 on support 29a, shaped similarly to the side wall of the cup and recessed into plate 11 at 30 to form a water-tight joint, the purpose of this joint being to prevent liquid in the bottom of the evaporating chamber, around the support, from coming in contact with tube 20 when heat is supplied to the latter within its lower extent. A liquid outlet pipe 32 threaded into plate 11 at 33, serves to remove liquid from chamber V as will be hereinafter described.

When it is desired to remove the evaporator E from the apparatus, caps 23 lock nuts 31a. and 21a are removed from the heater tube, lock nut 28a screwed from pipe 27, upper shell closure 13 moved to one side, cover 17 with weir 18 removed from plate 16 as previously described, and the evaporator lifted upwardly through the top of the condenser.

I will now describe generally the operation of unit U. It is assumed that heater tube 20 is brought to a suitable evaporating temperature throughout its heating length corresponding to the reistance wire extent 22a of heating element 22. Raw feed liquid from which distillate is to be produced is fed into compartment C through line 19, the amount of flow being regulated by valve 19c. The feed liquid flows upward, filling the annular space between the condenser tube 15 and shell 10, through apertures 16b, and overflows downward through the annular space A and in contact with heater tube 20 into uppermost cup 24a. The condenser tube preferably is sufficiently close to shell 10 in order that the liquid may flow with fairly high velocity and thus provide for efficient transfer of heat from the condenser tube 15 to the liquid. Due to vaporization within evaporating chamber E simultaneously with the feed liquid flow along the outer condenser surface, the feed temperature is raised as the liquid flows upward in compartment C due to its receiving heat which passes through the condenser wall from sources within the chamber as will be described later.

The feed liquid temperature is preferably raised to or near the boiling point of that portion of the liquid to be vaporized, by the time the feed reaches the upper edge of weir 18. In flowing downward through space A and in contact with tube 20, a portion of the feed may be vaporized, in which event the liquid flows into cup 24a and the vapor flows outwardly into the uppermost part of evaporating chamber E and condenses either on tube 15 or plates 16 and 17. A portion of the liquid in the cup is then vaporized due to its contact with hot tube 20 or portions of the cup receiving heat from the heater tube. Similarly, vaporization of the liquid continues as the liquid flows downwardly through those cups contained within the extent of heating element 22a. The liberated vapor condenses on the inner surface of condenser tube 15 and in so doing, gives up its heat of condensation which then passes through the tube wall and is taken up as sensible heat in the feed.

Additional transfer of heat from tube 20 to the condenser wall is effected in that heat from the portions T of the tube between the liquid level in the cups and the adjacent cup bottoms may serve to superheat the gases in chamber E, the superheat in turn being given up to the condenser tube, or it may be radiated directly to the condenser tube. It is by this feature of the invention that sufficient heat may be transferred from the heating element to the feed liquid outside the condenser tube wall to give the feed liquid a portion of its latent heat of vaporization before it enters the vaporizing chamber. For instance, assuming that heat transfer from the heating tube to the condenser tube occurred only through the medium of vapor exactly at its temperature of vaporization from the liquid phase, the temperature of feed liquid of similar composition obviously could be raised only to its boiling temperature by the transfer of heat of condensation of the vapor through the condenser tube wall. Further transfer of heat beyond this point would not occur due to equalization of temperatures of the feed and vapor inside the condenser tube, and therefore the feed would not receive any of the latent heat necessary for vaporization. However by the transfer of heat from the bare portions T of the heating tube, as hereinabove described, latent heat of vaporization may be transferred to the feed before actually entering the vaporizing chamber.

Residual liquid flows downwardly through the cups below the heating element 22a without further addition of heat. Due to thorough exposure of the liquid in so doing, by virtue of the large evaporation surface in the cups, the liquid may be cooled either by further vaporization at the expense of sensible heat of the liquid or by contact with gases which have been cooled through contact with the condenser tube. The cooled residual liquid or concentrate is discharged through pipe 27.

Condensate formed on the condenser inner wall flows downwardly in a thin film so that when it arrives at the base of the condenser tube it has given up most of its heat to the feed liquid and is cooled to a temperature near that of the inflowing feed. The distillate is discharged through pipe 32. The sizes of pipes 27 and 32 may be selected so that the outflowing liquid creates a suction which is effective in removing uncondensed gases from chamber E.

Bearing in mind the foregoing description of structure and operation of one specific and illustrative form of the invention, it can now be pointed out that, in a broad sense, the operation embodies the vaporization of the liquid during its flow along a suitable heating element and within and surrounded by a condenser wherein the cooling medium is the feed liquid that is constantly flowing to the evaporator. The evaporator may be viewed as being heat insulated by the surrounding condenser, which arrangement prevents or minimizes heat losses and necessitates the transfer into the feed liquid of substantially all the latent heat given up on condensation of the vapor. Due to these arrangements the heat losses from the apparatus are relatively small and, of course, may be kept down by proper insulation and in general are lower just in proportion as the temperature of the feed liquid in the condenser is kept low. However, the temperature to which the feed liquid shall be heated in the condenser depends also upon other considerations of operation. It will readily be seen that the total heat taken from the system is comprised of heat losses from the apparatus plus the sensible heat in the discharged distillate and residue. Generally speaking the amount of heat in the discharged distillate is a quantity depending upon the volume of distillate and its temperature, and is also a quantity dependent upon the amount of heat given up to the feed liquid in the condenser. Again the heat content of the feed liquid in the condenser, taken up in given quantity of heat from the distillate, depends again upon the amount of feed and upon the proportion of the total feed which is vaporized within the chamber; and the final temperature of the residue is a matter depending upon the rate of residue flow through the apparatus, upon the temperatures reached in the lower part of the apparatus around the heater tube, and is therefore dependent upon the temperatures of the distillate in the lower part of the apparatus and upon the amount of heat which may be thrown off from the residue by evaporization during its downward flow after leaving the directly heated zone. If in any case the sensible heat of the residue is large, it may be desirable to transfer some of that heat to the feed liquid before it goes to the condenser; but whether this is to be done in any given case involves also a consideration of the condensing efficiency of the so heated feed liquid, and also a consideration of the fact that a cooler feed liquid in the condenser does in fact take more heat from the residue during its travel through the lower parts of the apparatus.

For different purposes, dependent upon whether and how the sensible heat of the distillate or residue may be subsequently utilized, the apparatus may be operated at various rates of heat supply and of various rates of feed; and proportions of vaporization; but in general it is usually desirable, by proper proportioning of the parts of the apparatus to obtain the maximum heat transfer and by proper control of the feed rate and the proportion of the feed vaporized, to cause the temperatures of the discharged liquids, both distillate and residue, to approach as closely as possible to the feed temperature, with the resulting low net loss of heat. And since the heat put into the system need but equal that taken from the system, it is evident that comparatively little heat, considering that theoretically required for vaporization, need be supplied through the heating element. In the final analysis this low heat requirement is essentially due to the arrangement which greatly minimizes heat losses and to arrangements which provide for evaporization without any material loss of heat.

In order to carry out the operations that have now been described, the essential features of the apparatus may be viewed as comprising the central or interior heating and vaporizing arrangement surrounded, and preferably closely surrounded, by a condensing arrangement; means being provided to cause the unvaporized liquid to flow along preferably in close or good heat transfer relation or contact with the heater and vaporizer, keeping the unvaporized liquid around the heater and vaporizer until it is vaporized to the desired extent, and allowing the generated vapor then immediately to come into contact with, and to be immediately surrounded by, the condenser. Generally speaking, any suitable means for keeping the unvaporized liquid in proper relation or contact with the central heater may be utilized; and the arrangement of cups here illustrated is to be taken as but one specific illustration of a means that not only keeps the unvaporized liquid flowing closely around the heater, but also gives it a good and wide expanse of vaporization surface while keeping it in constant and fairly rapid motion, thus preventing deposit of sediment even when unvaporized liquid reaches high degree of saturation, with respect to substances carried in solution. Thus, although the described arrangement is at present preferred, other arrangements, which will accomplish the same general purposes, may be used; and in any case, as will of course be obvious, the external configuration of the heater tube and its connective parts may be made of such form as to increase the surface of heat conduction, if so desired.

The apparatus, even in the simple form as described, is capable of modification to vary greatly the ratio of evaporating surface to condensing surface, without any change in general design or construction. Without detailed description it will be seen how these ratios may be varied by changing the relative dimensions of the cup diameters, their spacings, and the diameter of the condenser tube; and these modifications, together with the control of liquid and heat supply previously spoken of, give the device a very wide range of effective operation.

And as regards the arrangement of the condenser, other specific structures may be utilized, just so long as the condenser with its feed liquid surrounds or substantially surrounds, or is in immediate contact with substantially the whole of the body of vapor that surrounds the interior evaporator.

Thus in Figures 5 and 6 I have illustrated types of condensers which may be used in place of the relatively simple type of Fig. 1, but which have the same general spacial arrangement with respect to the evaporator E. It is obvious that these and other similar types of condensers, by suitable proportioning of parts thereof, may provide increased condensing surface over that of the relatively simplified form of condenser previously described. The unit shown in Figure 5 is seen to embody an outer condenser shell 10, an upper closure 13, and an evaporator E, similar to those portions of Fig. 1. Plate 11b, joined to the shell as at 63 serves as a bottom end closure for evaporating chamber V, also as a tube sheet and as support for ring channel 60 which is removably fixed to plate 11b as at 61. A plurality of condenser tubes 15b are expanded at their lower ends into the bottom plate as at 62 and are similarly expanded at their upper ends into ring plate 16b, which is generally similar to plate 16 of Fig. 2 except that it is circular throughout its outer periphery and carries a gasket 67 on its outer edge for engagement with shell 10, as at 10b, to make a water tight joint between the shell and ring plate. Thus plate 16b, in addition to serving as a carrier for cover 17, serves as a floating tube sheet for movement within the shell as tubes 15b expand or contract. Condensate formed in chamber V may be drained therefrom through a line 32a extending through shell 10 as at 33a. The operation of this unit is similar to that of Fig. 1. Feed liquid, admitted to the ring channel interior 60a through line 19, flows upward through condenser tubes 15b into space 68 and thence downward through weir 18 as heretofore explained. The feed liquid containing compartment C1 which comprises the chamber 60a, the interior of tubes 15b and chamber 68, is obviously similar, in effect, to chamber C of Figure 1.

Figure 6 is generally similar to Figure 1 except that condenser tube 15 of the latter is replaced by tubular condenser coil 15c, and ring plate 16c is provided with gasket 67 around its outer periphery as described in the preceding paragraph. Bottom plate 70 is removably connected to shell 10 as at 65. Condenser coil 15c extends within evaporating chamber V and is joined to feed inlet line 19 by union 66, and at its upper extremity extends through plate 16c and into chamber 68a as at 71. Feed liquid flowing through line 19 passes upwardly through a coil 15c and into chamber 68a. The feed liquid containing compartment C2 in this instance comprises the space inside the tube coil and chamber 68a.

In Fig. 7 I have illustrated a battery embodiment of my invention having operating characteristics similar to those of a single unit but providing for increased capacity by the use of a number of units within a single outside shell. In the battery, an outer shell 10a, having bottom closure 11a and top closure 13b containing removable covers 13a, encloses a plurality of units 15 spaced from the shell and from each other to form liquid receiving compartment C. The purpose of this compartment is similar to that of compartment C of the single unit. Feed liquid inlet pipes 81 extend through bottom 11a and are spaced between the units U to effect even distribution of the feed within the shell in order that at any height H in the path of the upward flowing feed, the liquid temperatures between the various units will be substantially equal. To compensate for possible inequalities in the heights of weirs 18a, which inequalities would result in unequal flows of feed liquid to the separate evaporators, valves generally indicated at 35 are provided for regulating the amount of liquid which flows over the weirs into the evaporators. Each valve is comprised of a tubular stem 36 threaded about sheath 20 and extending through packing gland 37, handles 38, fastened on the stem, and tapered valve closure 36a, integral with the stem, for engagement in weir 18a. Leads 22b from the heating elements are seen to be connected to current supply lines 22c.

Distillate and residue flowing through lines 32a and 27a are discharged into receivers 40a and 40, respectively, which may lead to suitable distillate and residue containers. Bottom condenser tube closures 41, similar to plate 11 of Fig. 2, are joined to shell bottom 11a by screws 42 as shown. The general arrangement of parts at the base of each unit is similar to those of the previously described unit. Insulation 47 is provided for minimizing heat losses from the battery.

When it is desired to remove an evaporator E from the battery, leads 22b are disconnected from lines 22c, handle 38 is removed from stem 36, cover 13a moved to one side and a cylindrical shell 43, tapered at its lower end 43a lowered through the opening 13b to seat on plate 16 as illustrated in Figure 8. The latter is provided with raised bevel surface 44 for engagement with end 43a at shell 43 to form a water tight joint which prevents liquid in compartment C from flowing over the upper condenser closure. After removing cap 23, lock nut 28a, and lock nut 31a from the bottom of the heater tube 20, cover plate 17 may be screwed from its seat and with the evaporator lifted from the battery.

In Fig. 9 I have shown, conventionally, means for controlling pressure within unit U, although it is understood that any suitable pressure control means may be used. Lines 32 and 27 extend to distillate and residue receiving tanks 53 and 52, having drain valves 56. Line 54 extends from upper portions of the tanks to pump 55 as shown. Under normal conditions of distillation at atmospheric pressure, the unit operates as heretofore described with pressure release valve 58 open to the atmosphere. If it is desired to operate at pressures above atmospheric, valve 58 may be adjusted accordingly, pressure within the apparatus built up by vaporization within chamber E, and the liquid in tanks 52 and 53 intermittently drained through valves 56. For operation under vacuum, valve 58 is closed, and pressure within the apparatus reduced by pump 55. Liquid in the tanks is maintained at sufficient height so that liquid pressure on the bottoms of the tanks is equivalent to the atmospheric pressure, and any liquid in excess of that required to maintain that height may be drained through valves 56. The feed pressure in line 19 is in all instances, regulated according to the distillation pressure.

Certain salient features of the invention are recognized from the above description, irrespective of relatively detailed characteristics of embodiments described therein. Thus it is seen that by substantially surrounding an evaporating means by condensing means, provision is made for a distillation system of highest thermal efficiency, as set forth hereinabove in considering its theoretical aspects. More explicity, by providing evaporating means of the general character described, efficient transfer of heat from the heating means to the raw liquid is effected, and by providing condensing and cooling means of such nature that said heat contained either in liquid or vapor is transferred almost entirely to the cool feed liquid, the efficiency of the system is obviously of high magnitude.

It will be understood the drawings and description are to be considered merely as illustrative of and not restrictive on the broader claims appended hereto, for various changes in design, structure and arrangement may be made without departing from the spirit and scope of said claims.

I claim:

1. A distillation apparatus embodying a liquid carrying condenser having a wall which is in liquid contact at one surface and immediately surrounds a vapor chamber at its opposite surface, an evaporating means in the vapor chamber, means for directing liquid from the condenser into the vapor chamber and to the evaporating means, and means for removing condensate from the lower part of the vapor chamber.

2. A distillation apparatus embodying a liquid carrying condenser having a wall which is in liquid contact at one surface and immediately surrounds a vapor chamber at its opposite surface, an evaporating means in the vapor chamber, means for directing liquid from the condenser into the vapor chamber and to the evaporating means, means for directing such liquid in a flow around and in heat transferring contact with the evaporating means, and means for removing condensate from the lower part of the vapor chamber.

3. In a distillation apparatus, an outer shell enclosing a vertically disposed condenser tube and spaced therefrom to form a liquid containing compartment, end closures for the tube, evaporating means within the condenser tube and annularly spaced therefrom, and valve controlled means in the upper end tube closure for directing the flow of liquid from said compartment to the evaporating means.

4. In a distillation apparatus, a liquid carrying condenser in a vertically extending tubular formation defining an inner vapor chamber, one wall of the condenser contacting liquid on one side and vapor on the other, a heater tube extending vertically and centrally within the vapor chamber, means to feed liquid to be distilled into the lower end of the condenser, means to direct liquid from the upper end of the condenser to the upper end of the heater tube, means to direct flow of liquid downwardly around the heater tube out of contact with the condenser, said means comprising a series of vertically spaced cups surrounding the tube, and overflow means directing liquid from one cup to a cup next below, and means to take off condensate at the bottom of the vapor chamber out of contact with the heating tube.

5. In a distillation apparatus, an outer shell enclosing a vertically disposed condenser tube and spaced therefrom to form a liquid containing compartment, a vaporizing chamber within the condenser, an evaporator within the chamber and spaced from the condenser, valve means for admitting raw liquid to the lower end of said compartment, valve means for admitting heated raw liquid from the upper end of the compartment to the evaporator, and means for separately discharging distillate and residue from said chamber.

6. In a distillation apparatus, a vertically extending condenser in tubular formation embodying annularly spaced inner and outer walls, the inner wall defining an inner vapor chamber, an evaporator within the chamber and spaced from said inner wall, means for admitting raw liquid to the base of the annular space between the condenser walls, means to direct liquid from the upper end of said space to the evaporator, means for separately discharging distillate and residue from said chamber, and means for controlling the pressure in the chamber.

7. In a distillation apparatus, an outer shell, a plurality of vertically disposed condenser tubes within the outer shell horizontally spaced therefrom and from each other to define a common liquid receiving compartment, each condenser tube enclosing an evaporating chamber, separate evaporating means within each condenser tube, annularly spaced therefrom and extending through the outer shell, means for feeding liquid into the base of the common compartment, and means for selectively controlling flow of liquid from the compartment into the several evaporating chambers.

8. A distillation apparatus, embodying a heater tube, means to direct flow of liquid about the tube in contact with a portion of it only, so that a remaining portion of the tube may be in direct contact with vapors arising from the liquid, walls forming a liquid-carrying condenser in hollow formation and arranged in direct heat transfer contact with such vapors, and means for directing feed liquid through the condenser and to the heater tube.

9. In a distillation apparatus, a vertically extending condenser in tubular formation embodying annularly spaced inner and outer walls, the inner wall defining an inner vapor chamber, a heating means extending vertically and centrally within the vapor chamber and spaced from said inner wall, means to introduce liquid to be distilled to the base of the annular space between the condenser walls, means to direct liquid from the upper end of said annular space to the upper end of the heating means, means to direct liquid flow downwardly in contact with the heating means and out of contact with the inner condenser wall, and means for taking off condensate within the vapor chamber from the bottom of the inner condenser wall.

10. In a distillation apparatus, walls forming a vertically disposed condenser in a tubular formation which surrounds an inner vapor chamber, a heater within the upper interior of said chamber and spaced from the chamber walls, means for supplying liquid to said heater, means within the condenser and below said heater for causing extended surface exposure of liquid heated by the heater, and means for separately discharging distillate and residue from said chamber.

11. In a distillation apparatus, walls forming a vertically disposed liquid carrying condenser in a tubular formation which surrounds an inner vapor chamber, a heater within the upper interior of said chamber and spaced from the chamber walls, means for discharging liquid from the upper portion of said condenser to the heater, means within the condenser and below said heater for causing extended surface exposure of liquid heated by the heater, and means for separately discharging distillate and residue from said chamber.

12. In a distillation apparatus, a vertically extending condenser in tubular formation embodying annularly spaced inner and outer walls, the inner wall defining an inner vapor chamber, a heater tube extending downwardly within said chamber from the upper end thereof and spaced from said inner condenser wall, means to feed liquid to be distilled to the base of the annular space between the condenser walls, means to direct liquid from the upper end of said space to the upper end of the heater tube, heat supplying means within the tube and extending downwardly only a part way through said chamber, means on the heater tube below said heat supply means for causing extended surface exposure of heated liquid, and means for separately discharging distillate and residue from said chamber.

13. In a distillation apparatus, a common outer shell, a plurality of vertically disposed condenser tubes within the common outer shell, said tubes being horizontally spaced from the shell and from each other to define a common liquid receiving compartment, within the outer shell and surrounding the several tubes, each condenser tube enclosing an evaporating chamber, separate evaporating means within each condenser tube and annularly spaced therefrom, means for feeding liquid into the base of the common compartment, means for directing and selectively controlling flow of liquid from the upper part of the compartment to the upper ends of the evaporating means in the several evaporating chambers, and means for separately discharging residue and condensate from the lower ends of each of the several evaporating chambers.

14. A distillation apparatus embodying, walls forming a liquid carrying condenser in a tubular formation which surrounds an inner evaporating chamber, heating means in the evaporating chamber and spaced from the chamber wall, means for feeding liquid to the condenser, means for directing liquid from the condenser to one end of the heating means, and means to direct the flow of liquid along the heating means and in direct contact with a portion of its heating surface only, whereby vapors evolved from heated liquid may come into direct contact with the remaining portion of the heating surface for superheating.

15. The method of distilling a liquid, that includes, generating and maintaining a body of vapor by passing liquid over a heater and in heat transferring relation to the body of vapor, maintaining a liquid feed through a zone surrounding the heater, said liquid feed thereby taking up the heat of condensation of the vapors, and superheating the vapors at said heater to cause the heat of superheat to be transferred to the feed.

16. In a distillation apparatus, a structure defining an elongated vapor space, an evaporator within said structure and adjacent said vapor space, a condenser included within said structure and having a heat transfer wall in direct exposure to vapors in said vapor space, means for feeding liquid through said condenser wherein the liquid is preheated, means for conducting the preheated liquid from said condenser over said evaporator, the liquid being vaporized in passing over the evaporator, and the vapors being liberated into said vapor space and condensed on the wall of said condenser, means for drawing off the unvaporized residue from said evaporator, and means for separately drawing off the condensate.

17. In a distillation apparatus, a structure defining an elongated vapor space, an elongated evaporator within said structure and adjacent said vapor space, a condenser included within said structure and having a heat transfer wall in direct exposure to vapors in said vapor space, said condenser being spaced from the evaporator and extending substantially parallel therewith, means to feed liquid to be distilled into one end of the condenser, means to direct the liquid from the other end of the condenser to one end of the evaporator, the liquid then being vaporized in passing longitudinally over said evaporator in a reverse direction to its path through the condenser, and the vapors being liberated into said vapor space and condensed on the wall of said condenser, means for drawing off the unvaporized residue from said evaporator, and means for separately drawing off the condensate.

18. In a distillation apparatus, a structure defining an elongated vapor space, an elongated evaporator within said structure and adjacent said vapor space, means for supplying heat to a part length only of said evaporator, a condenser included within said structure and having a heat transfer wall in direct exposure to said vapor space, said condenser being spaced from the evaporator and extending substantially parallel therewith, means to feed liquid to be distilled into one end of the condenser, means to direct the liquid from the other end of the condenser to one end of the evaporator, the liquid then being vaporized in passing longitudinally over said evaporator in a reverse direction to its path through the condenser, and the vapors being liberated into said vapor space and condensed on the wall of said condenser, means for drawing off the unvaporized residue from said evaporator, and means for separately drawing off the condensate.

19. Distillation apparatus comprising, a shell, a liquid carrying condenser in tubular formation within said shell and defining an inner vapor space, said condenser comprising a plurality of liquid carrying tubes arranged about said vapor space, an evaporator extending longitudinally and centrally through the vapor space, means to feed liquid to be distilled to the condenser, means to direct the liquid from one end of the condenser to one end of said evaporator, means to direct the liquid longitudinally over the evaporator to its opposite end, and means for supplying heat to said evaporator.

In witness that I claim the foregoing I have hereunto subscribed my name this 20th day of April, 1928.

HENRY I. LEA.

liberated into said vapor space and condensed on the wall of said condenser, means for drawing off the unvaporized residue from said evaporator, and means for separately drawing off the condensate.

18. In a distillation apparatus, a structure defining an elongated vapor space, an elongated evaporator within said structure and adjacent said vapor space, means for supplying heat to a part length only of said evaporator, a condenser included within said structure and having a heat transfer wall in direct exposure to said vapor space, said condenser being spaced from the evaporator and extending substantially parallel therewith, means to feed liquid to be distilled into one end of the condenser, means to direct the liquid from the other end of the condenser to one end of the evaporator, the liquid then being vaporized in passing longitudinally over said evaporator in a reverse direction to its path through the condenser, and the vapors being liberated into said vapor space and condensed on the wall of said condenser, means for drawing off the unvaporized residue from said evaporator, and means for separately drawing off the condensate.

19. Distillation apparatus comprising, a shell, a liquid carrying condenser in tubular formation within said shell and defining an inner vapor space, said condenser comprising a plurality of liquid carrying tubes arranged about said vapor space, an evaporator extending longitudinally and centrally through the vapor space, means to feed liquid to be distilled to the condenser, means to direct the liquid from one end of the condenser to one end of said evaporator, means to direct the liquid longitudinally over the evaporator to its opposite end, and means for supplying heat to said evaporator.

In witness that I claim the foregoing I have hereunto subscribed my name this 20th day of April, 1928.

HENRY I. LEA.

CERTIFICATE OF CORRECTION.

Patent No. 1,845,159.             Granted February 16, 1932, to

HENRY I. LEA.

It is hereby certified that error appears in the printed specification of the above numbered patent requiring correction as follows: Page 7, lines 90 to 92, claim 15, strike out the words "and in heat transferring relation to the body of vapor" and insert the same after the word "heater" in line 93, of same claim; and that the said Letters Patent should be read with this correction therein that the same may conform to the record of the case in the Patent Office.

Signed and sealed this 12th day of April, A. D. 1932.

(Seal)

M. J. Moore,
Acting Commissioner of Patents.

CERTIFICATE OF CORRECTION.

Patent No. 1,845,159.                                            Granted February 16, 1932, to

HENRY I. LEA.

It is hereby certified that error appears in the printed specification of the above numbered patent requiring correction as follows: Page 7, lines 90 to 92, claim 15, strike out the words "and in heat transferring relation to the body of vapor" and insert the same after the word "heater" in line 93, of same claim; and that the said Letters Patent should be read with this correction therein that the same may conform to the record of the case in the Patent Office.

Signed and sealed this 12th day of April, A. D. 1932.

(Seal)                                                            M. J. Moore,
                                                                      Acting Commissioner of Patents.